(12) United States Patent  
Kafyeke et al.

(10) Patent No.: US 8,789,798 B2  
(45) Date of Patent: Jul. 29, 2014

(54) SLAT CONFIGURATION FOR FIXED-WING AIRCRAFT

(75) Inventors: Fassi Kafyeke, Laval (CA); Marc Langlois, Montréal (CA); Cedric Kho, Montréal (CA)

(73) Assignee: Bombardier Inc., Dorval, Quebec (CA)

( * ) Notice: Subject to any disclaimer, the term of this patent is extended or adjusted under 35 U.S.C. 154(b) by 556 days.

(21) Appl. No.: 12/866,679

(22) PCT Filed: Feb. 12, 2008

(86) PCT No.: PCT/IB2008/000311  
§ 371 (c)(1),  
(2), (4) Date: Nov. 13, 2010

(87) PCT Pub. No.: WO2009/101461  
PCT Pub. Date: Aug. 20, 2009

(65) Prior Publication Data  
US 2011/0049305 A1     Mar. 3, 2011

(51) Int. Cl.  
*B64C 3/50*     (2006.01)

(52) U.S. Cl.  
USPC ........................................................ 244/214

(58) Field of Classification Search  
USPC .................. 244/213, 214, 215, 218  
See application file for complete search history.

(56) References Cited

U.S. PATENT DOCUMENTS

| | | | | |
|---|---|---|---|---|
| 4,384,693 A | * | 5/1983 | Pauly et al. | 244/207 |
| 5,039,032 A | * | 8/1991 | Rudolph | 244/35 R |
| 5,335,886 A | * | 8/1994 | Greenhalgh | 244/213 |
| 6,089,502 A | * | 7/2000 | Herrick et al. | 244/35 R |
| 6,152,404 A | | 11/2000 | Flaig et al. | |
| 7,048,228 B2 | * | 5/2006 | Vassberg et al. | 244/35 R |
| 7,270,305 B2 | * | 9/2007 | Rampton et al. | 244/214 |
| 7,475,854 B2 | * | 1/2009 | Lacy et al. | 244/215 |
| 7,500,641 B2 | * | 3/2009 | Sakurai et al. | 244/215 |
| 7,744,040 B2 | * | 6/2010 | Lacy et al. | 244/215 |
| 2004/0195464 A1 | * | 10/2004 | Vassberg et al. | 244/216 |
| 2005/0017126 A1 | * | 1/2005 | McLean et al. | 244/35 A |

FOREIGN PATENT DOCUMENTS

DE     197 43 907     10/1998

OTHER PUBLICATIONS

Internationl Search Report for PCT/IB2008/000311, dated Dec. 30, 2008.

* cited by examiner

*Primary Examiner* — Tien Dinh  
*Assistant Examiner* — Keith L Dixon  
(74) *Attorney, Agent, or Firm* — Thomas, Karceski & Karmilovich, PC

(57) ABSTRACT

A slat for fixed-wing aircraft that includes a leading edge, a trailing edge, a chord, and an inboard edge that includes particular dimensions to affect airflow over the wing.

37 Claims, 7 Drawing Sheets

TAKE-OFF CONFIGURATION
M=0.2 Re$_{MAC}$ =6.7X10$^6$ $C_{L\ MAX}$

LANDING CONFIGURATION
M=0.2 Re$_{MAC}$ =6.7X10$^6$ $\alpha_{MAX}$

SLAT CONFIGURATION FOR FIXED-WING AIRCRAFT

CROSS-REFERENCE TO RELATED APPLICATION(S)

This is a National Stage Entry into the United States Patent and Trademark Office from International PCT Patent Application No. PCT/IB2008/000311, having an international filing date of 12 Feb. 2008, the contents of which is incorporated herein by reference.

FIELD OF INVENTION

The embodiments of the present invention are directed to slats located on the leading edge of wings for fixed-wing aircraft. More specifically, the embodiments of the present invention are directed to the particular configuration of the inboard edge of such slats.

STATEMENT RE FEDERALLY SPONSORED RESEARCH OR DEVELOPMENT

The embodiments of the present invention as described herein have not been sponsored by the federal government.

NAMES OF THE PARTIES TO A JOINT RESEARCH AGREEMENT

The embodiments of the present invention have been invented by the inventors that executed the Declaration. The inventors have not entered into a joint research agreement with any third parties re the aspects of the present invention.

BACKGROUND OF THE INVENTION

It is known in the art that high performance jet aircraft use leading edge slats to improve a wing's maximum lift by delaying stall onset. A greater maximum lift and delayed stall mean lower operating speeds for take-off and landing, reduced take-off and landing distances and/or higher take-off weight.

There are a number of apparatuses in the prior art that have been used to improve the performance of leading edge slats. An example of one such apparatus is provided in U.S. Pat. No. 6,152,404 ("the '404 patent") which describes an apparatus that includes a vortex generator arranged on an inboard edge of each leading edge slat in the area of the wing root. The apparatus also includes a transition fairing arranged on a separation edge that is let into the leading edge of the wing root and that borders along the inboard edge of the slat.

FIG. 3 shows a "hingewise" inboard edge configuration of known in the art slats and FIG. 4 shows a "streamwise" inboard edge configuration. These configurations, however, do not provide the wing maximum lift and delayed stall onset that the embodiments of the present invention provide. Consequently, there is a need for an improved slat configuration for fixed-wing-aircraft that achieves greater maximum lift and delays stall onset.

SUMMARY OF THE EMBODIMENTS OF THE PRESENT INVENTION

For the reasons provided above, it is an object of an embodiment of the present invention to have an improved slat configuration for a fixed-wing aircraft that achieves greater maximum lift and delays stall onset. Such an objective is attained by providing a slat that includes a leading edge, a trailing edge, a chord and an inboard edge that further includes a first leg that extends from the leading edge and a second leg that extends from the first leg to the trailing edge. In this embodiment, the first leg of the inboard edge extends straight to the trailing edge for at least 40% of the chord.

Another object of an embodiment of the present invention is to provide a slat that includes a leading edge, a trailing edge, a chord and an inboard edge that includes a first leg that extends from the leading edge and a second leg that extends from the first leg to the trailing edge. In this embodiment, the first leg extends straight to the trailing edge for no more than 90% of the chord.

Yet another object of an embodiment of the present invention is to provide a slat for fixed-wing aircraft that includes a leading edge as measured by a line connecting the forward-most points of the slat, a trailing edge as measured by a line connecting the aft-most points of the slat, a chord as measured by a distance between the leading edge and trailing edge of the slat, as measured in a direction of normal airflow, and an inboard edge that includes a first leg that extends from the leading edge and a second leg that extends from the first leg to the trailing edge. In this embodiment, the first leg extends straight to the trailing edge for about 60% of the chord, the second leg is angled inward to the slat where the angle is acute in relation to the first leg; when the slat is on an aircraft, the second leg is angled in an outboard direction in relation to the first leg. In addition, in such an embodiment one end of the first leg is connected to the leading edge and the other end of the first leg is connected to the second leg, and one end of the second leg is connected to the first leg and the other end of the second leg is connected to the trailing edge.

One other object of an embodiment of the present invention is to provide a slat that includes a leading edge as measured by a line connecting the forward-most points of the slat, a trailing edge as measured by a line connecting the aft-most points of the slat, a chord as measured by a distance between the leading edge and trailing edge of the slat, as measured in a direction of normal airflow, and an inboard edge that includes a means for affecting airflow over the wing.

Another object of an embodiment of the present invention is to provide a slat that includes a leading edge; a trailing edge, a chord and an inboard edge that includes a first leg that extends from the leading edge and a second leg that extends from the first leg to the trailing edge. In this embodiment, the first leg is substantially normal to the leading edge and the second leg is angled inward to the slat.

DETAILED DESCRIPTION OF THE EMBODIMENTS OF THE PRESENT INVENTION

Figure 1:
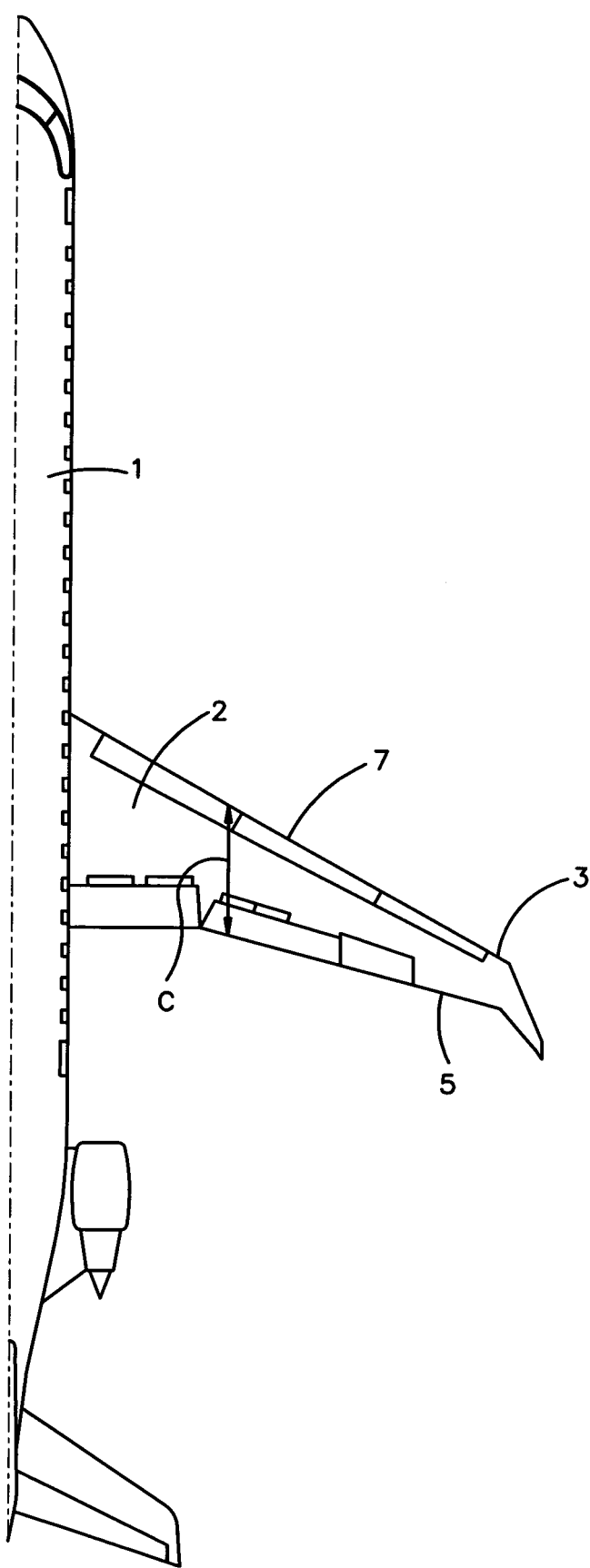
FIG. 1 shows a top view of an aircraft cut down its centre-line to show its right half.

FIG. 1 shows a top view of a fixed-wing jet aircraft cut down its centreline to only show the right half of the aircraft. FIG. 1 includes the basic features of an aircraft that will be discussed herein including the fuselage 1 or body of the aircraft, and the wing 2 that produces the lift and therefore flight. The wing 2 includes a leading edge 3, a trailing edge 5, and includes a chord "C" that refers to the distance between the leading edge 3 and trailing edge 5 of the wing 2, as measured in a direction of normal airflow. Those skilled in the art will understand that since most wings change their chord over their width as shown for example in FIG. 1, the mean aerodynamic chord ("MAC") is used to compare different wing configurations. In general, for the wing 2 shown in FIG. 1, more lift is generated on the wider inner sections of the wing 2 as compared to the narrow outer sections of the wing 2. Those skilled in the art will also understand that each wing 2 includes a particular airfoil or shape of the wing 2 as shown in a cross-sectional view of a wing (no cross sectional view of the wing has been included herein as those skilled in the art will readily understand what the airfoil means). The lift coefficient ("lift coefficient" or "CL") referred to herein is the number associated with a particular shape of an airfoil to predict the lift force generated by a wing 2 having such an airfoil. Moreover, the angle of incidence ("α") also referred to herein refers to the angle between the airflow direction and the longitudinal axis of an aircraft. Lastly, those skilled in the art will understand that the term "stall" refers to a sudden reduction in the lift forces generated by a particular airfoil, especially when a certain angle of attack of the wing 2 in relation to airflow is exceeded. This sudden reduction causes the aircraft to drop suddenly. The inventors and other aerodynamic engineers are constantly looking to develop means to maximize a wing's CL and to delay stall. As mentioned above, a greater maximum lift and delayed stall mean lower operating speeds, shorter distances for take-offs and landings and/or higher take-off weights.

FIG. 1 also shows the slats 7 and their positioning on the leading edge 3 of the wing 2. In general, the slats 7 are small aerodynamic surfaces on the leading edge of the wings of fixed-wing aircraft which, when deployed, allow the wing 2 to operate at a higher angle of attack in relation to the airflow. The lift coefficient as mentioned above is a product of the angle of attack and speed so by deploying slats aircraft can fly slower or take off and land in a shorter distance. Slats are generally deployed while taking off or landing or performing maneuvers which take the aircraft close to stall, but are generally stowed in normal flight to minimize drag. The chord of the slat is typically only a few percent of the wing's chord and is measured in a direction normal to the slat's leading edge. Furthermore, slats may generally extend over the outer two thirds of the wing 2 or may cover the entire leading edge 3 of the wing 2.

Figure 2:
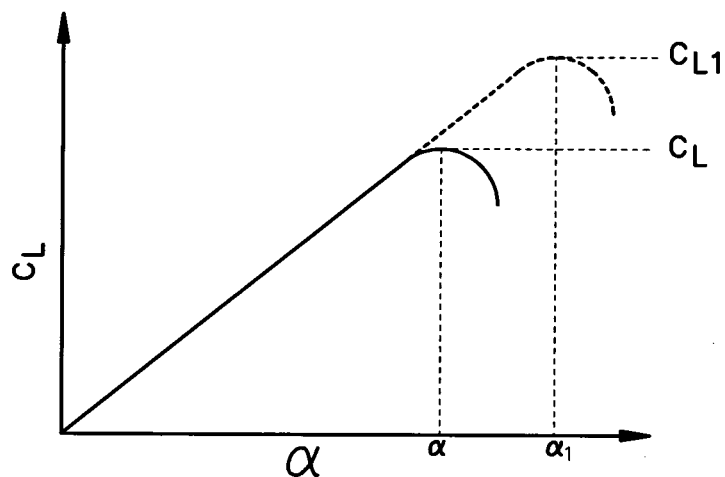
FIG. 2 shows a graph that depicts the relationship of the lift coefficient to the angle of incidence for aircraft that include wings that have slats and for aircraft that include wings that do not have slats.

FIG. 2 shows a graph that depicts the relationship of the lift coefficient to the angle of incidence for aircraft that include wings that have slats and for aircraft that include wings that do not have slats. As shown in FIG. 2, the lift coefficient CL1 increases and stall is delayed to a higher angle α1 when slats are utilized as compared to when slats are not utilized as indicated by CL and α. In addition, on aircraft without underwing engines in particular, partial-span slats are used in order to insure that the wing 2 stalls first on the inboard part of the wing 2 that is not protected by a slat 7. This ensures that the aircraft stalls symmetrically with a nose-down pitching movement and therefore remains fully controllable during a stall.

Figure 5:
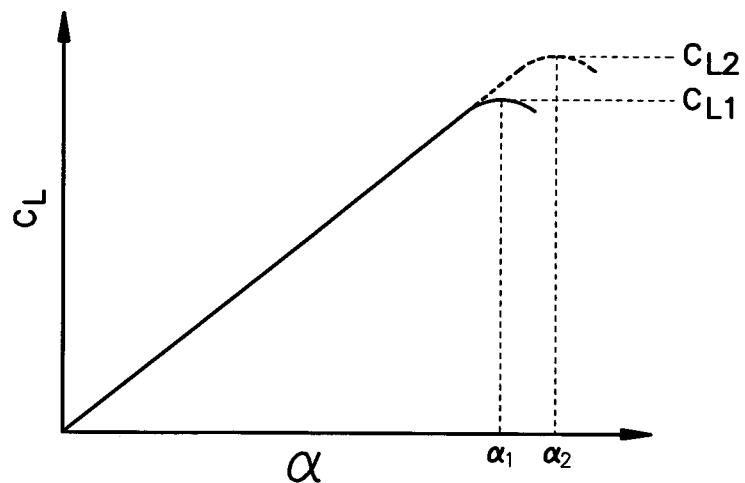
FIG. 5 shows a graph that depicts the relationship of the lift coefficient to the angle of incidence for slats having a stream-wise and hingewise configuration.
Figure 3:
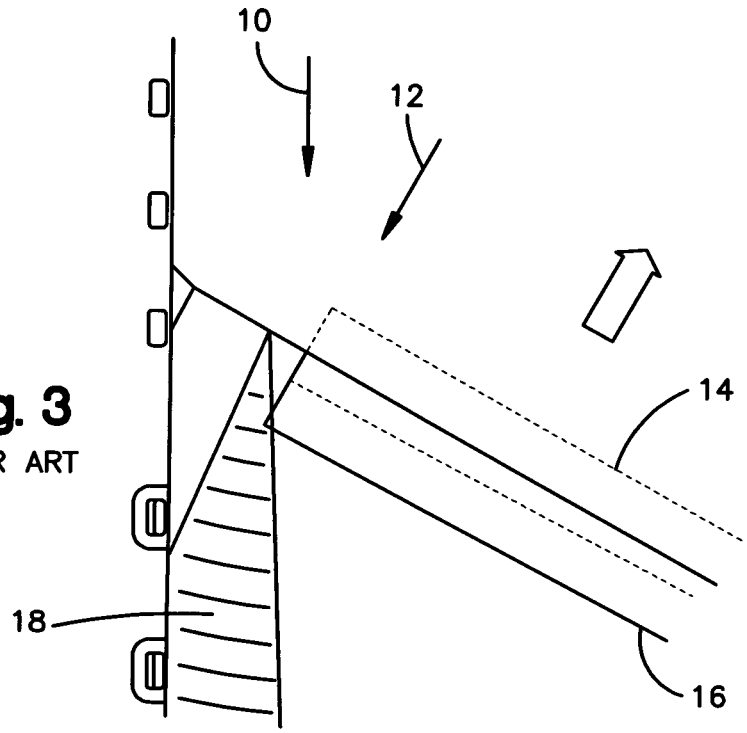
FIG. 3 shows a top view of a wing, its connection to the fuselage and the inboard edge of a slat that includes a hinge-wise slat end configuration.
Figure 4:
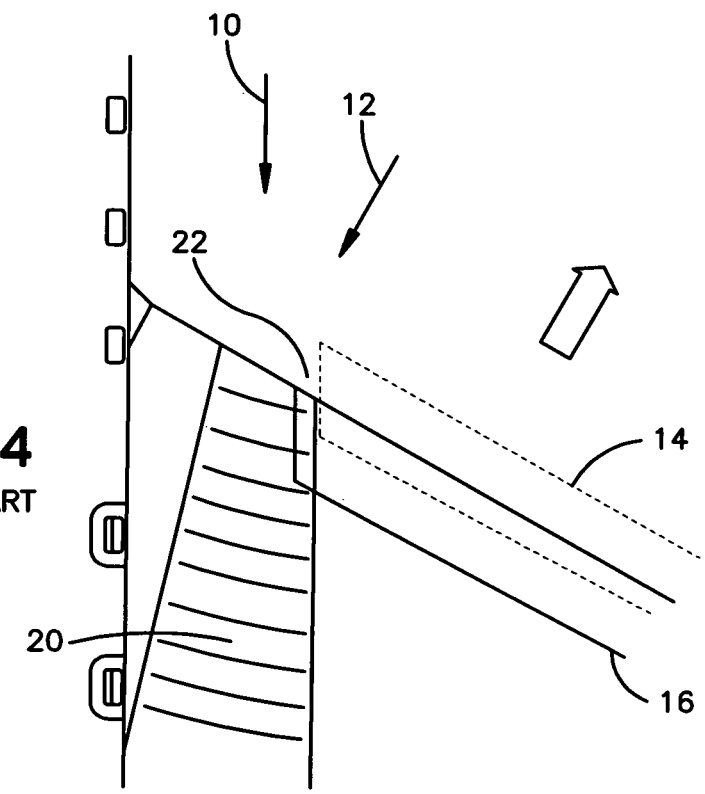
FIG. 4 shows a top view of a wing, its connection to the fuselage and the inboard edge of a slat that includes a stream-wise slat end configuration.

FIGS. 3 and 4 show top views of the wing 2, the wing's connection to the fuselage 1 and the inboard edge of a slat 7 that includes a hingewise and streamwise slat end configuration, respectively. In each figure, reference numeral 10 depicts the streamwise direction and reference numeral 12 depicts the hingewise direction. Also, the solid line 16 of the slat 7 shows the slat in a stowed position and the dotted line 14 shows the slat 7 when deployed. These figures also denote regions 18 and 20, respectively, that show the initial stall region for each configuration, each said stall region starting out narrow on the leading edge 3 of the wing 2 between the inboard edge of the slat 7 and the fuselage 1, and expanding towards the trailing edge 5 of the wing 2. In general, the slats 7 are deployed in a hingewise direction, i.e., in a direction normal to the leading edge 3, as demonstrated by the arrow in FIGS. 3 and 4. When a slat 7 with an inboard hingewise configuration (FIG. 3) is deployed, the initiation of stall occurs at the leading edge 3 of the wing 2, just inboard of the inboard edge of the slat 7. When a slat 7 with an inboard streamwise configuration (FIG. 4) is deployed, the initiation of stall occurs at the gap 22 that opens between the fixed leading edge and the inboard edge of the slat 7. As shown in FIG. 5, stall α1 occurs generally earlier for a slat with the streamwise configuration than stall α2 with a hingewise configuration and therefore the streamwise configuration has a lower CL1 than the hingewise configuration CL2 shown in FIG. 3, except when the slat 7 extends very close to the fuselage 1. In other words, FIG. 5 shows that for a wing 2 with a leading edge slat that does not extend all the way inboard to the fuselage, the configuration with a hingewise configuration gives a higher CL2 and a higher stall angle of incidence α2 than the configuration with a streamwise configuration (CL1 & α1). This is because the deployment of the slat having a streamwise configuration creates a gap 22 (shown in FIG. 4) on the inboard edge of the configuration and an earlier stall is initiated at this location. For this reason, most aircraft with a partial-span slat not extending to the fuselage 1 use configurations with a hingewise inboard slat end configuration. Leading edge slats 7 with inboard streamwise configurations are mostly found on aircraft with leading edge slats 7 extending all the way inboard to the fuselage 1, which typically includes aircraft with underwing mounted engines.

An embodiment of the present invention describes a slat geometry modification that further improves the CL and stall angle of incidence α of an aircraft fitted with leading edge slats. The devices used in the prior art including the vortex generator discussed in the '404 patent are not typically applicable to aircraft that utilize a slat having a hingewise configuration on the inboard edge because they are not aligned with the air flow and will therefore create too much drag in a cruise configuration. All these devices are also set to affect the wing root flow and are therefore better suited to aircraft with slats extending very close to the fuselage.

Figure 6:
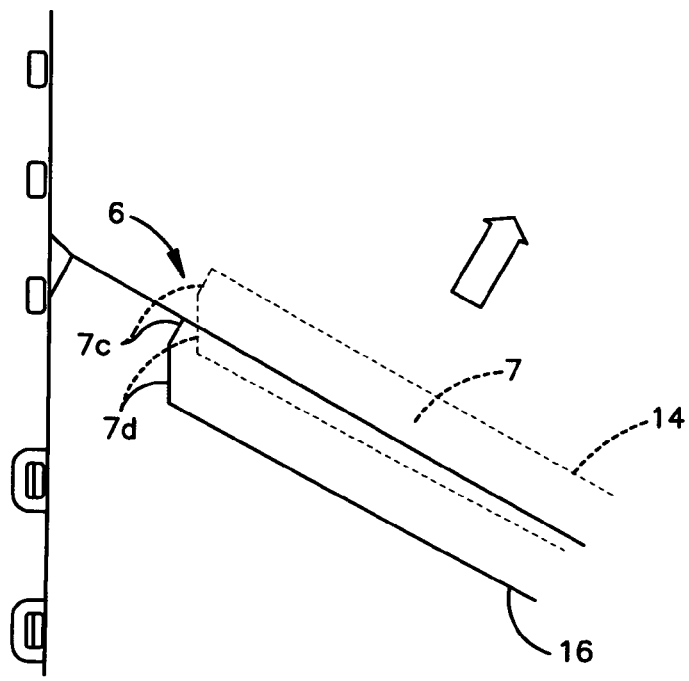
FIG. 6 shows a top view of a wing, its connection to the fuselage and the inboard edge of a slat that includes an embodiment of the present invention.

FIG. 6 shows a top view of a wing 2, its connection to the fuselage 2 and an inboard edge of a slat that includes an embodiment of the present invention. The solid line 16 of the slat 7 shows the slat in a stowed position and the dotted line 14 shows the slat 7 when deployed. Furthermore, FIG. 7 shows a top view of an inboard edge of a slat that includes an embodiment of the present invention.

More specifically, an embodiment of the present invention includes a configuration with an inboard edge 6 of slat 7 consisting of a first leg 7c and a second leg 7d that extends from the first leg to the trailing edge. The first leg 7c is preferably substantially hingewise since the inventors have determined that this configuration leads to a higher maximum lift and higher stall angle than a streamwise configuration. For the purpose of this patent application "substantially hingewise" means that the first leg 7c must be substantially parallel to the edge of the opening in the wing surface that exist to receive slat 7; to avoid interference with such edge, first leg 7c can be typically angled inwardly (i.e. in an outboard direction) by up to 10 degrees (as compared to a true parallel direction) without affecting performance. Furthermore, such edge of the opening in the wing surface is preferably substantially normal to wing leading edge 3, but can vary by a factor of ±10 degrees (as compared to a direction truly normal to the wing leading edge 3). The location of the start of second leg 7d varies between 0% of slat chord C2, as measured from the leading edge 14 (i.e. pure streamwise configuration) and 100% of slat chord C2 (i.e. pure hingewise configuration). The edge 6 of the rear leg 7d is preferably angled substantially streamwise, i.e., substantially parallel to airflow when in use on an aircraft, but can vary by a factor of ±10 degrees and the preferred location of the start of rear leg 7d is between 40% and 90% of the slat chord (as measured from the slat leading edge 14). The formula of 40% C2<C1<90% C2 represents an embodiment of the present invention. A preferred embodiment is around 60% C2 but this may vary based on a particular wing's configuration.

Figure 7:
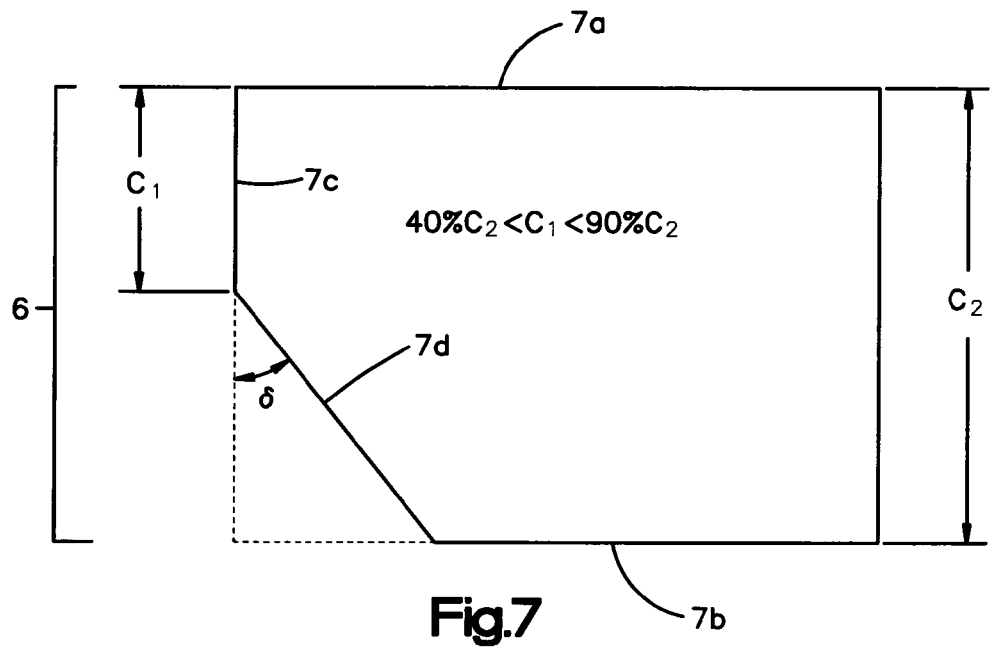
FIG. 7 shows a top view of an inboard edge of a slat that includes an embodiment of the present invention.

The slat according to the embodiments of the present invention may include a leading edge as measured by a line connecting the forward-most points of the slat, a trailing edge as measured by a line connecting the aft-most points of the slat, a slat chord "C2" as shown in FIG. 7 as measured by a distance between the leading edge and trailing edge of the slat, as measured in a direction normal to the slat leading edge, and an inboard edge that includes a first leg 7c that extends from the leading edge and a second leg 7d that extends from the first leg to the trailing edge. In one embodiment, the first leg extends hingewise aft for no more than 40% of the slat chord C2; in contrast, the full hingewise configuration includes an inboard edge that extends straight to the trailing edge for 100% of the chord and in regard to the streamwise configuration, the first leg is angled for 100% of the chord as shown for example in FIGS. 3 and 4. In another embodiment, the first leg extends hingewise aft for no more than 90% of the chord; again, in contrast, the hingewise configuration includes an inboard edge that extends straight to the trailing edge for 100% of the chord as shown in FIG. 3. In regard to the streamwise configuration, the first leg is angled for 100% of the chord as shown for example in FIG. 4. In yet another embodiment the first leg extends hingewise aft between 50% and 70% of the slat chord C2, preferably for about 60% of the chord; in contrast, again, the hingewise configuration includes an inboard edge that extends straight to the trailing edge for 100% of the chord as shown in FIG. 3. In regard to the streamwise configuration, the first leg is angled for 100% of the chord as shown for example in FIG. 4. In each of the examples provided above, the 40%, 50-70%, 60% and 90% of slat chord C2 refers to the length of the first leg 7c starting from the leading edge of the slat and extending straight to the trailing edge of this leg.

In the embodiments of the present invention the second leg 7d of the inboard edge 6 of the slat is angled inward to the slat 7 as shown for example in FIG. 7; when the slat is on an aircraft, the second leg is angled in an outboard direction in relation to the first leg. The angle "δ" as shown in FIG. 7 is acute (i.e. less than 90 degrees e.g., 30 degrees, 45 degrees) in relation to the first leg 7c so that the second leg 7d is relatively streamwise; it is believed that a ±10 degrees variation away from second leg 7d being relatively streamwise still achieves the benefits of this invention. A person of ordinary skill in the art will appreciate that one end of the first leg 7c is connected to the leading edge 7a and the other end of the first leg 7c is connected to the second leg 7d, and one end of the second leg 7d is connected to the first leg 7c and the other end of the second leg 7d is connected to the trailing edge 7b.

Figure 8:
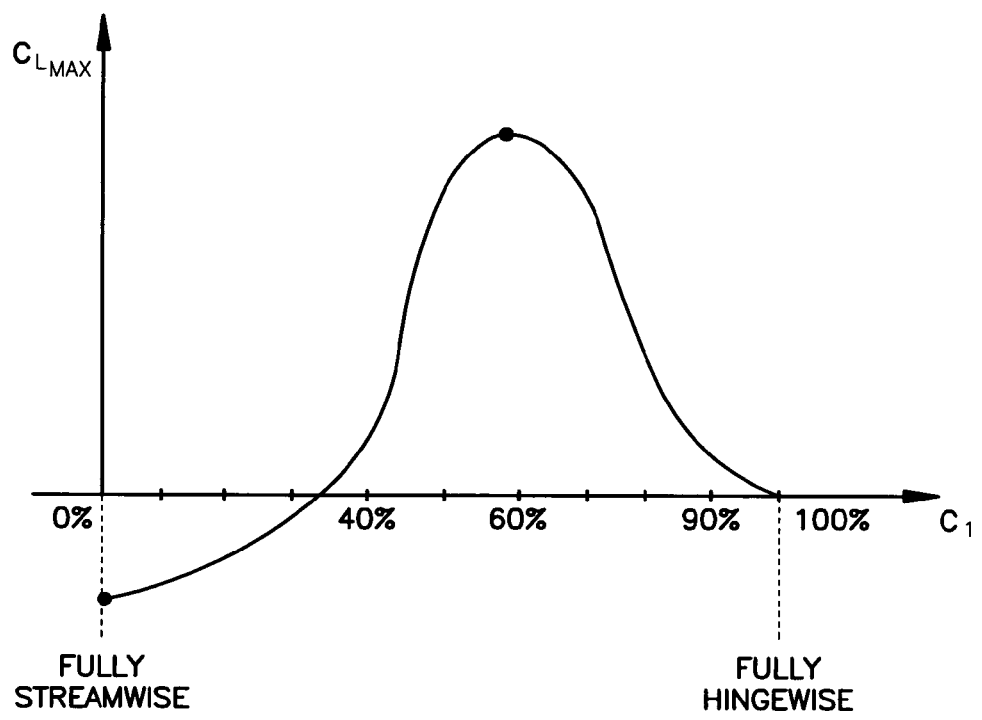
FIG. 8 shows a gaussian curve that depicts the relationship of the lift coefficient to the configuration of the trailing, inboard edge of a slat according to an embodiment of the present invention.

FIG. 8 shows a gaussian curve that depicts the relationship of the lift coefficient to the configuration of the trailing, inboard edge 6 of a slat 7 according to an embodiment of the present invention. More specifically, FIG. 8 shows that the advantages (i.e., increasing CL and stall angle) of a slat 7 having a configuration according to an embodiment of the present invention occur as a person of ordinary skill in the art moves the end of first leg 7c from 100% (full hingewise configuration) to about 60% of the slat chord C2, where it reaches a peak CL and stall angle. This is due to the fact that as the end of first leg 7c moves away from the 100% position, the vortex moves away from (and therefore interferes less with) the air flowing over the inboard section of the wing. As a person of ordinary skill in the art moves the end of first leg 7c further away from the trailing edge 7b and past 60% of the slat chord, the advantages as shown in FIG. 8 start to decrease again as you start to open a gap between the fixed leading edge 7a and the inboard edge 6 of the slat and therefore start slowly introducing the same disadvantage that is inherent in a full streamwise configuration. This is because the initial stall location moves away from the wing surface towards the wing under-slat surface at gap 22. The gaussian curve shown in FIG. 8 also shows that at about 40% of the chord, the advantages (i.e., increasing CL and stall angle) are about the same as with a pure hingewise configuration. Past 40%, the advantages continue to decrease until they are the same as a pure streamwise configuration (at 100% chord).

Figure 9:
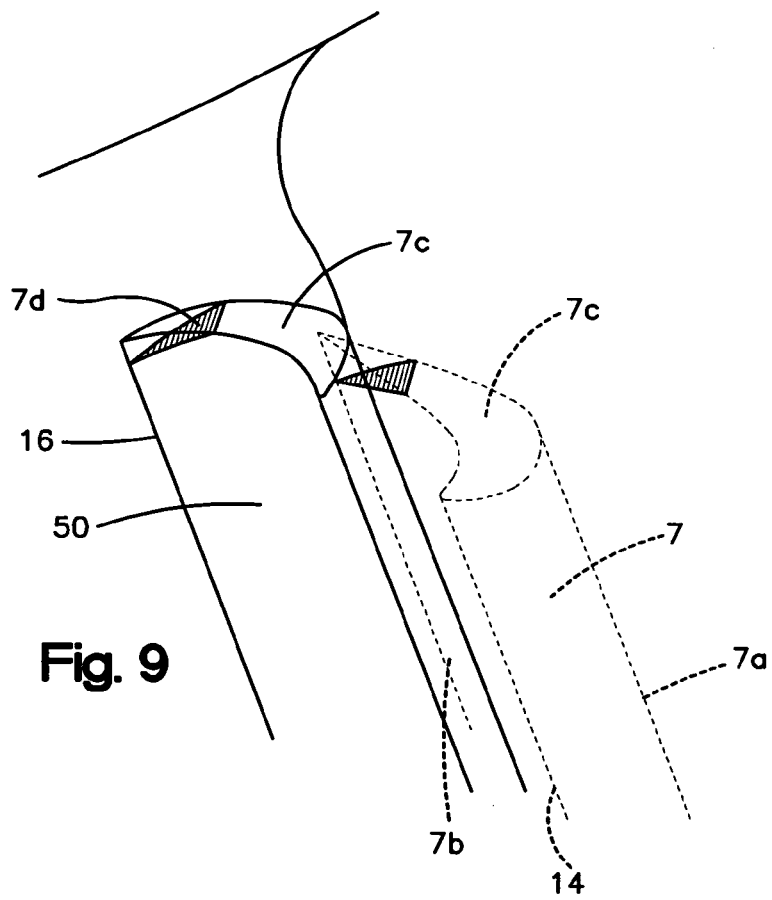
FIG. 9 illustrates in three dimensions an embodiment of the present invention, as viewed from an underside of the slat.

FIG. 9 illustrates in three dimensions an embodiment of the present invention, as viewed from an underside of the slat 7 on the wing's underslat surface 50. As noted above, the solid line 16 of the slat 7 shows the slat 7 in a stowed position and the dotted line 14 shows the slat 7 when deployed.

Figure 10:
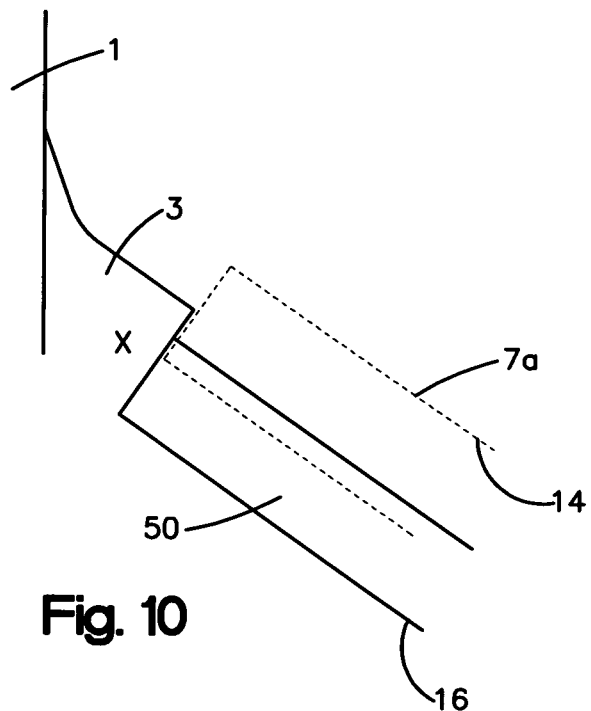
FIG. 10 shows an underside view of a hingewise configuration of the inboard edge of a slat as shown in FIG. 3 above.
Figure 11:
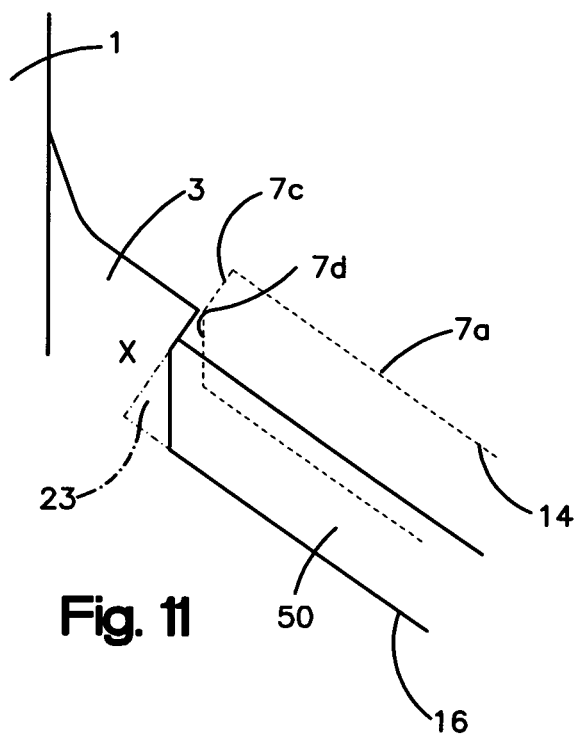
FIG. 11 shows an underside view of an embodiment of the present invention.

FIGS. 10 and 11 show views of the top of a wing, with FIG. 10 showing a hingewise configuration as shown in FIG. 3 above and FIG. 11 showing an embodiment of the present invention directed to the inboard edge 6 of the slat 7. Normally, for hingewise configurations, the wing's leading edge 3 has a rectangular opening to receive slat 7. However, pursuant to this invention as shown in FIG. 11, a "pie-shaped" fixed wing structure 23 is present on the wing's surface 50 in order to not leave a hole in the surface of the wing 2 at the junction with the wing's leading edge 3 when the slat 7 is in the stowed position 16. This additional structure is aligned with the flow and does not create additional drag when the slat 7 is deployed. Moreover, FIGS. 10 and 11 show that the initial stall "X" occurs at the same location on the wing but in FIG. 11, the stall occurs at a higher angle of incidence because the configuration of the inboard edge according to an embodiment of the present invention introduces a favourable interference that delays the stall while retaining the superiority of a hingewise slat over a 100% streamwise slat.

Figure 12:
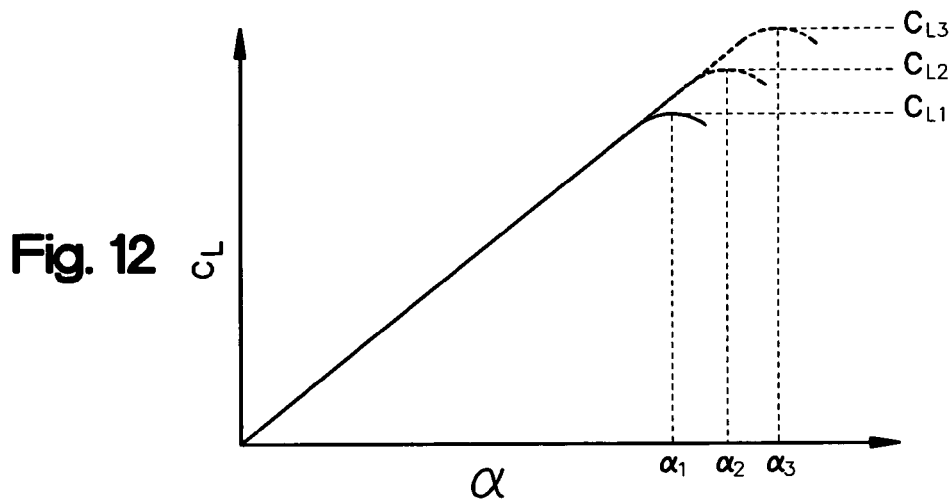
FIG. 12 shows a graph that depicts the relationship of the lift coefficient to the angle of incidence for slats having a streamwise configuration, hingewise configuration and particular configuration of an inboard edge of a slat according to an embodiment of the present invention.
Figure 13:
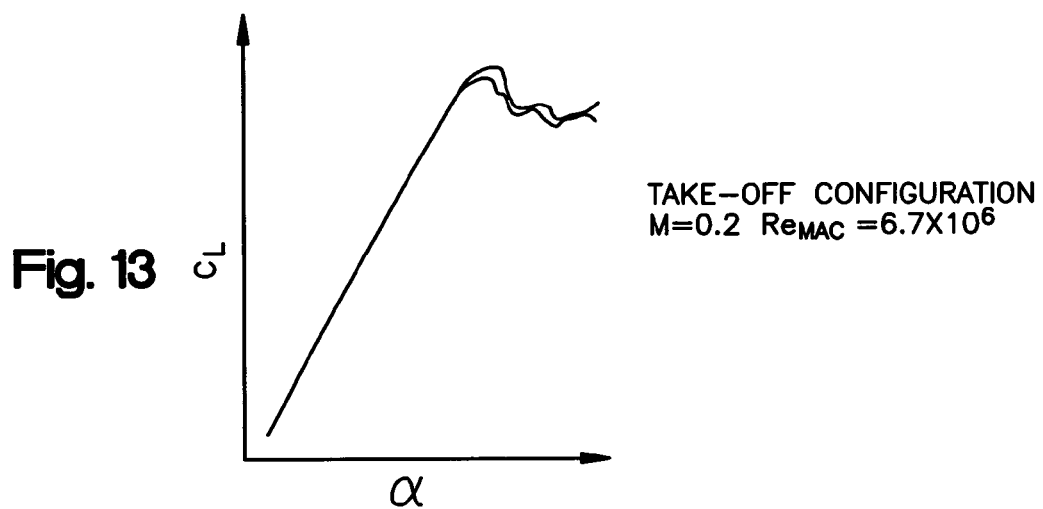
FIG. 13 shows a graph for a take-off configuration that depicts the relationship of the lift coefficient to the angle of incidence for a slat that includes and for a slat that does not include an embodiment of the present invention.
Figure 14:
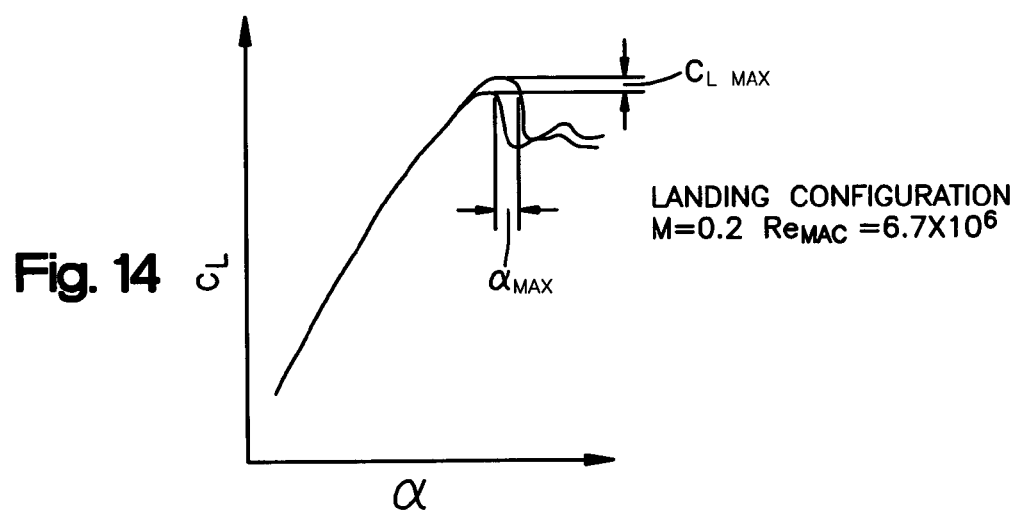
FIG. 14 shows a graph for a landing configuration that depicts the relationship of the lift coefficient to the angle of incidence for a slat that includes and for a slat that does not include an embodiment of the present invention.

FIG. 12 shows a graph that depicts the relationship of the lift coefficient to the angle of incidence for slats having a streamwise configuration, hingewise configuration and configuration according to an embodiment of the present invention. As noted thereon, the lift coefficient CL3 and stall angle of incidence $\alpha 3$ for a slat having the dimensions according to an embodiment of the present invention is greater than the lift coefficient CL2 and stall angle of incidence $\alpha 2$ for known in the art hingewise configurations and greater than the lift coefficient CL1 and stall angle of incidence $\alpha 1$ for known in the art streamwise configurations. Moreover, as shown in FIGS. 13 and 14, when a slat according to an embodiment of the present invention is used, the CL MAX and $\alpha$ MAX stall increases when the slats are deployed during take-off and landing. More specifically, the maximum lift coefficient is increased by between about 0.1 and about 0.25, and the $\alpha$ stall increased by about 2 degrees to about 4 degrees depending on the aircraft's configuration. As a result, the performance of the aircraft is improved during both take-offs and landings.

The embodiments of the present invention do not require any independent movable system and as such reduces the aircraft's weight, complexity and maintenance needs compared to other systems or structural modifications that may achieve similar increases in performance. The advantages related to utilizing the embodiments of the present invention have been validated both theoretically and experimentally. Theoretical computations with a 3D Navier-Stokes CFD model of a complete aircraft confirmation indicate improvements in the order of $\Delta\alpha$ of about 2 degrees to about 4 degrees stall angle and lift coefficient increases between about 0.1 and about 0.25 were verified accordingly. A slat having the features according to the embodiments of the present invention was also experimentally tested on a wind tunnel model at high Reynolds numbers.

This specification is intended to provide a person of ordinary skill in the art with the requisite information to enable such a person to make and use the embodiments of the present invention without undue experimentation. The specification is not intended to limit the aspects of embodiments of the present invention as recited in the claims below.

What is claimed is:

1. A slat for an aircraft wing, comprising:
   a leading edge defining a leading edge line connecting forward-most points of the slat and extending between a wing root end and an outboard end;
   a trailing edge defining a trailing edge line connecting aft-most points of the slat, extending between the wing root end and the outboard end, and being disposed a chord distance from the leading edge in a hingewise direction, wherein the chord distance between the leading edge and the trailing edge extends normal to the leading edge;
   an inboard edge comprising
      a first leg that extends from the leading edge to an intermediate point between the leading edge and the trailing edge, and
      a second leg that extends from the intermediate point to the trailing edge; and
   an outboard edge that extends from the leading edge to the trailing edge,
   wherein the second leg is disposed at an angle to the first leg, toward the outboard edge.

2. The slat according to claim 1, wherein the first leg defines a straight line.

3. The slat according to claim 1, wherein the second leg defines a straight line.

4. The slat according to claim 1, wherein the second leg is disposed substantially parallel to airflow when the slat is on an airplane.

5. The slat according to claim 1, wherein the first leg extends for no more than 90% of the chord distance.

6. The slat according to claim 1, wherein the first leg extends for at least 40% of the chord distance.

7. The slat according to claim 1, wherein the first leg extends between 40% and 90% of the chord distance.

8. The slat according to claim 1, wherein the first leg extends between 50% and 70% of the chord distance.

9. The slat according to claim 1, wherein the first leg extends for about 60% of the chord distance.

10. The slat according to claim 1, wherein the first leg extends for no more than 60% of the chord distance.

11. The slat according to claim 7, wherein the first leg extends for no more than 60% of the chord distance.

12. The slat according to claim 8, wherein the first leg extends for no more than 60% of the chord distance.

13. The slat according to 1, wherein the second leg extends for at least 10% of the chord distance.

14. The slat according to claim 1, wherein the first leg is parallel to the chord.

15. The slat according to claim 1, wherein the outboard edge is parallel to the chord.

16. The slat according to claim 1, wherein the first leg and the outboard edge are parallel to the chord.

17. The slat according to claim 1, wherein the second leg is substantially parallel to airflow when the slat is mounted on an airplane.

18. The slat according to claim 1, wherein the slat increases a lift coefficient when mounted on a wing of an airplane.

19. The slat according to claim 1, wherein the slat delays stall when mounted on a wing of an airplane.

20. An airplane with an inboard slat mounted on a wing, the slat comprising:
   a leading edge defining a leading edge line connecting forward-most points of the slat and extending between a wing root end and an outboard end;
   a trailing edge defining a trailing edge line connecting aft-most points of the slat, extending between the wing root end and the outboard end, and being disposed a chord distance from the leading edge in a hingewise direction, wherein the chord distance between the leading edge and the trailing edge extends normal to the leading edge;
   an inboard edge comprising a first leg that extends from the leading edge to an intermediate point between the leading edge and the trailing edge, and
a second leg that extends from the intermediate point to the trailing edge; and
an outboard edge that extends from the leading edge to the trailing edge,
wherein the second leg is disposed at an angle to the first leg, toward the outboard edge.

21. The airplane according to claim 20, wherein the first leg extends for no more than 90% of the chord distance.

22. The airplane according to claim 20, wherein the first leg extends for at least 40% of the chord distance.

23. The airplane according to claim 20, wherein the first leg extends between 40% and 90% of the chord distance.

24. The airplane according to claim 20, wherein the first leg extends between 50% and 70% of the chord distance.

25. The airplane according to claim 20, wherein the first leg extends for about 60% of the chord distance.

26. The airplane according to claim 20, wherein the first leg extends for no more than 60% of the chord distance.

27. The airplane according to claim 23, wherein the first leg extends for no more than 60% of the chord distance.

28. The airplane according to claim 24, wherein the first leg extends for no more than 60% of the chord distance.

29. The airplane according to 20, wherein the second leg extends for at least 10% of the chord distance.

30. The airplane according to claim 20, wherein the first leg is parallel to the chord.

31. The airplane according to claim 20, wherein the outboard edge is parallel to the chord.

32. The airplane according to claim 20, wherein the first leg and the outboard edge are parallel to the chord.

33. The airplane according to claim 20, wherein the second leg is substantially parallel to airflow when the slat is mounted on the wing.

34. The airplane according to claim 20, wherein the slat increases a lift coefficient when mounted on the wing.

35. The airplane according to claim 20, wherein the slat delays stall when mounted on the wing.

36. The airplane according to claim 20, wherein the first leg defines a straight line.

37. The airplane according to claim 20, wherein the second leg defines a straight line.

\* \* \* \* \*